(12) United States Patent
Ogura et al.

(10) Patent No.: US 9,134,558 B2
(45) Date of Patent: Sep. 15, 2015

(54) THIN DISPLAY DEVICE

(71) Applicant: Panasonic Corporation, Osaka (JP)

(72) Inventors: Motonari Ogura, Osaka (JP); Yuuichi Hasegawa, Osaka (JP); Tadahiro Kugimaru, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 145 days.

(21) Appl. No.: 13/935,671

(22) Filed: Jul. 5, 2013

(65) Prior Publication Data

US 2013/0293805 A1 Nov. 7, 2013

Related U.S. Application Data

(63) Continuation of application No. PCT/JP2012/001445, filed on Mar. 2, 2012.

(30) Foreign Application Priority Data

Mar. 3, 2011 (JP) ................................. 2011-046232

(51) Int. Cl.
*G02F 1/1333* (2006.01)
*B65D 81/05* (2006.01)
*H04N 5/64* (2006.01)

(52) U.S. Cl.
CPC ........ *G02F 1/133308* (2013.01); *B65D 81/055* (2013.01); *B65D 81/057* (2013.01); *B65D 2585/6837* (2013.01); *H04N 5/64* (2013.01)

(58) Field of Classification Search
CPC ......................... B65D 81/055; G02F 1/133308
USPC ...................................................... 349/58, 60
See application file for complete search history.

(56) References Cited

U.S. PATENT DOCUMENTS

| | | | |
|---|---|---|---|
| 2006/0055839 A1* | 3/2006 | Hirao et al. ...................... | 349/58 |
| 2008/0129920 A1* | 6/2008 | Ito ................................... | 349/60 |
| 2009/0140963 A1* | 6/2009 | Okumura et al. ............... | 345/87 |

FOREIGN PATENT DOCUMENTS

| | | | |
|---|---|---|---|
| CN | 101575023 | 11/2009 | |
| CN | 201367197 Y | 12/2009 | |
| JP | 2001-133759 | 5/2001 | |
| JP | 2003-344826 | * 12/2003 | ............ G02F 1/1333 |
| JP | 2008-105683 | 5/2008 | |
| JP | 2008-292689 | 12/2008 | |
| JP | 2009-139426 | 6/2009 | |
| JP | 2009-200543 | 9/2009 | |
| JP | 2010-247852 | 11/2010 | |
| JP | 2010-274970 | * 12/2010 | ............ B65D 81/113 |

OTHER PUBLICATIONS

Office Action issued Jul. 31, 2014 in corresponding Chinese Patent Application No. 201280004271.3 with partial En
Chinese Search Report issued Jul. 31, 2014 in corresponding Chinese Patent Application No. 201280004271.3 with partial English translation.
Japanese Office Action (OA) issued Jul. 8, 2014 in corresponding Japanese Patent Application No. 2013-502201.
English translation of International Preliminary Report on Patentability issued Sep. 12, 2013 in International (PCT) Application No. PCT/JP2012/001445.
International Search Report issued Apr. 3, 2012 in International (PCT) Application No. PCT/JP2012/001445. glish translation.

* cited by examiner

*Primary Examiner* — Sang V Nguyen
(74) *Attorney, Agent, or Firm* — Wenderoth, Lind & Ponack, L.L.P.

(57) ABSTRACT

A flat display device includes a display unit and an outer casing accommodating the display unit. Upper corner regions and lower corner regions of the outer casing are held by upper corner shock-absorbing members and lower corner shock-absorbing members disposed separately at upper corners and lower corners of a packing box when the flat display device is accommodated in the packing box. The outer casing includes a front cabinet disposed on a side of a display surface of the display unit and a back cabinet covering a rear surface of the display unit. The back cabinet is attached to the front cabinet by screw fastening portions at a peripheral portion of the back cabinet. In the upper and lower corner regions of the outer casing, the screw fastening portions of the back cabinet are positioned within regions held by the shock-absorbing members.

9 Claims, 9 Drawing Sheets

Fig. 9

THIN DISPLAY DEVICE

CROSS-REFERENCE TO RELATED APPLICATIONS

This is a continuation application of International Application No. PCT/JP2012/001445, with an international filing date of Mar. 2, 2012, which claims priority of Japanese Patent Application No.: 2011-046232 filed on Mar. 3, 2011, the content of which is incorporated herein by reference.

BACKGROUND

1. Technical Field

The present disclosure relates to a thin display device such as a liquid crystal display device used in a television receiver, a monitor device, or the like.

2. Description of Related Art

Needs for liquid crystal display devices has been growing as professional-use as well as residential-use flat-type video display unit.

Generally, the liquid crystal display device includes a display module. The display module includes a flat-type liquid crystal display panel a flat-type liquid crystal display panel and a backlight device as surface light source disposed on the rear side of the flat-type liquid crystal display device. The display module is accommodated in a thin housing including a front cabinet and a back cabinet. (see JP 2009-139426 A).

As backlight devices using LEDs become widespread, the liquid crystal display devices are intended to be further thinned. Further, in view of improvement of design of appearance, thin frame-shaped liquid crystal display devices in which a peripheral portion of the front cabinet is narrowed as compared with an image display region have been increasing.

In the thin display device such as the liquid crystal display device, there is a tendency that a mechanical strength as a display device is weakened as compared with ordinary devices, because the thickness of the thin display device is further reduced and the narrow frame design is employed. This results in that damage caused by a mechanical impact suffered during transportation has been concerned.

SUMMARY

The present disclosure has been accomplished in view of the above circumstances, and it is an object of the present disclosure to prevent a thin display device from being damaged by an external force such as a mechanical impact suffered during transportation.

In order to solve the problem mentioned above, the present disclosure provides a flat display device, comprising, a display unit including a flat-type display panel and a drive circuit block for displaying an image on the display panel, and an outer casing accommodating the display unit, upper corner regions and lower corner regions of the outer casing being held by upper corner shock-absorbing members and lower corner shock-absorbing members disposed separately at upper corners and lower corners of a packing box when the flat display device is accommodated in the packing box. The outer casing includes a front cabinet disposed on a side of a display surface of the display unit and a back cabinet covering a rear surface of the display unit. The back cabinet is attached to the front cabinet by screw fastening portions provided at a peripheral portion of the back cabinet. The upper and lower corner regions of the outer casing, the screw fastening portions of the back cabinet are positioned within regions held by the shock-absorbing members.

In the thin display device according to the present disclosure, the screw fastening portions provided in the peripheral portion of the back cabinet are positioned within the region of the upper and lower corner regions of the outer casing which is held by the shock-absorbing members. This configuration enables the display panel to be prevented from being damaged by an external force such as a mechanical impact suffered during transportation.

DETAILED DESCRIPTION

Figure 1:
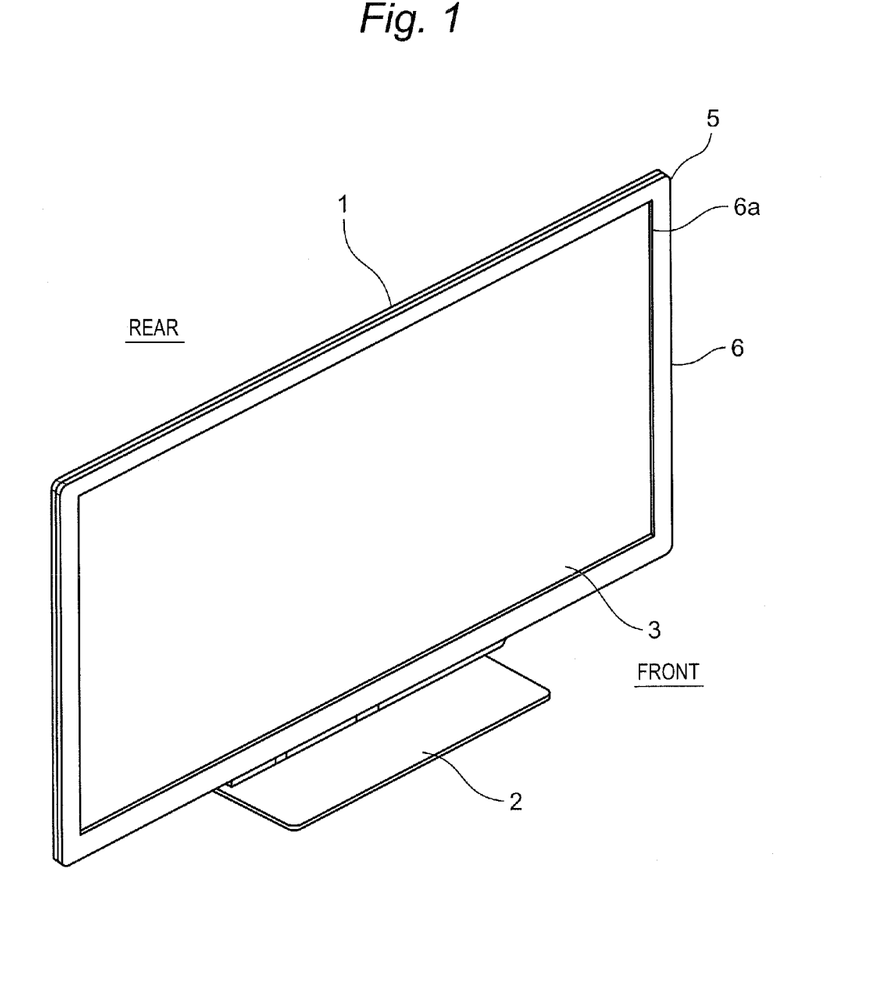
FIG. 1 is a front perspective view showing an outward appearance of a liquid crystal display device according to an embodiment of the present disclosure.

A thin display device according to an embodiment of the present disclosure will be described below with reference to the drawings, with a display module used in a liquid crystal display device taken as an example. Meanings of terms concerning positions and directions used in the following description are as mentioned below unless otherwise specified. In FIG. 1, terms "front surface" and "rear surface" are used with reference to a liquid crystal display panel 3. Specifically, of both surfaces of the liquid crystal display panel 3, a surface on which an image is displayed is referred to as the "front surface", and a surface opposite thereto is referred to as the "rear surface". Furthermore, "upper", "lower", "left", "right", and "lateral" are used with reference to the liquid crystal display panel 3 as viewed from the front side when the attitude of the liquid crystal display device is set for its use.

Figure 2:
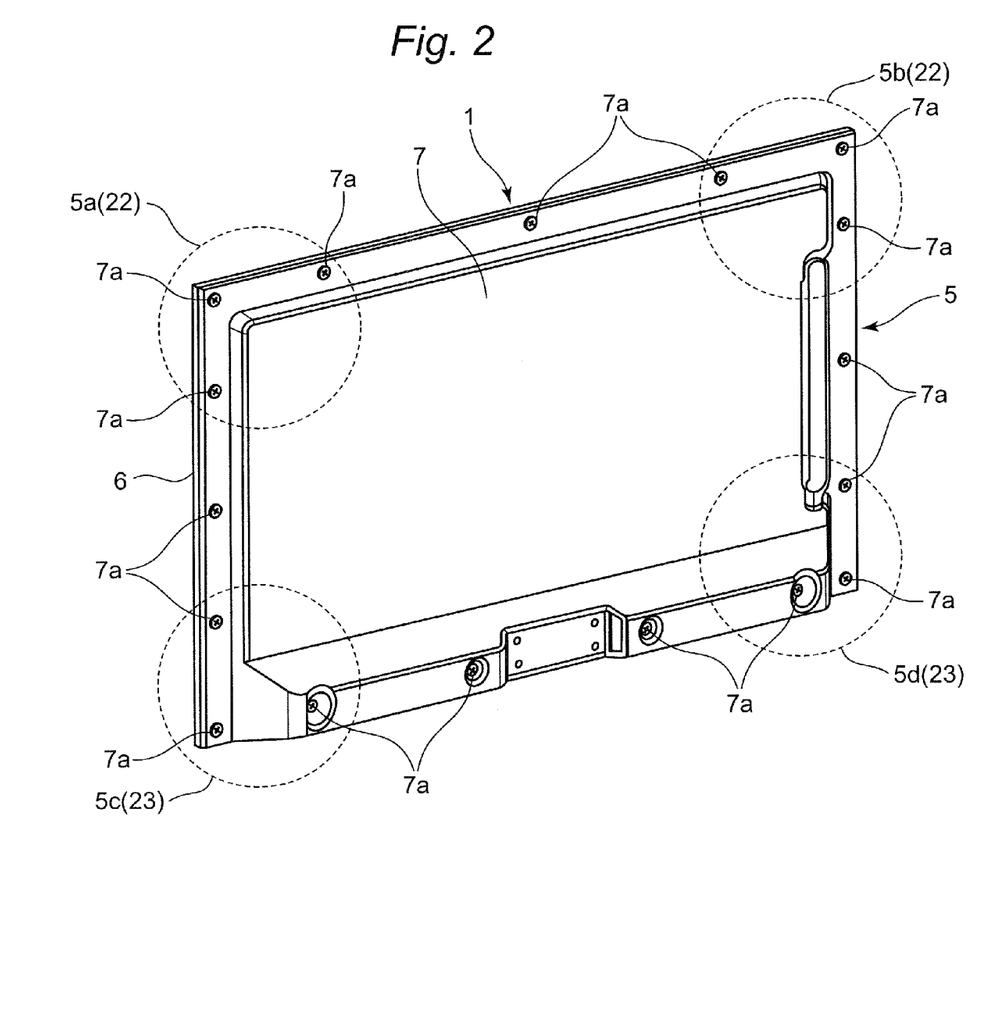
FIG. 2 is a back perspective view showing a state where a stand of the liquid crystal display device is detached.
Figure 3:
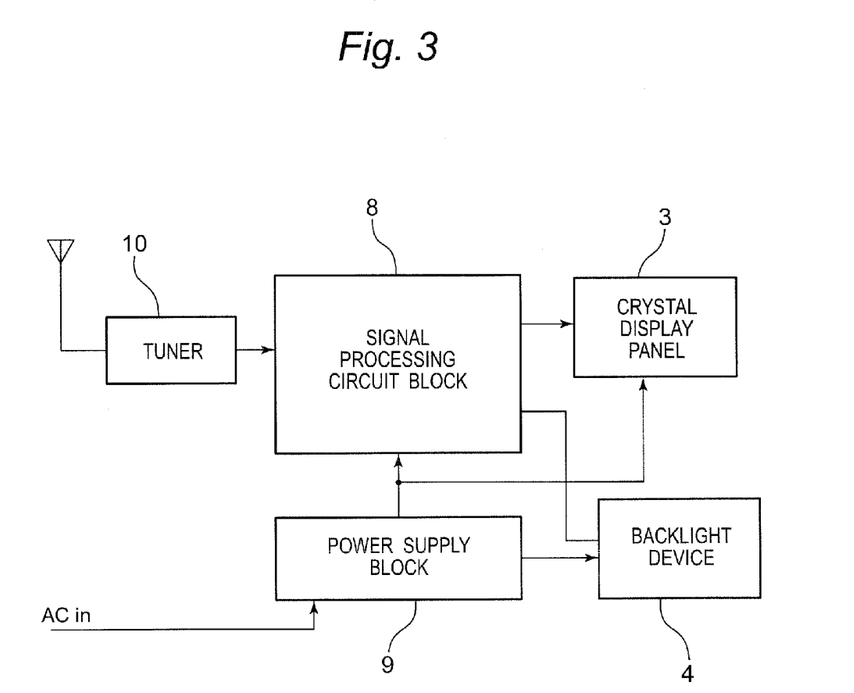
FIG. 3 is a block diagram showing a circuit block of an entire structure of the liquid crystal display device.
Figure 4:
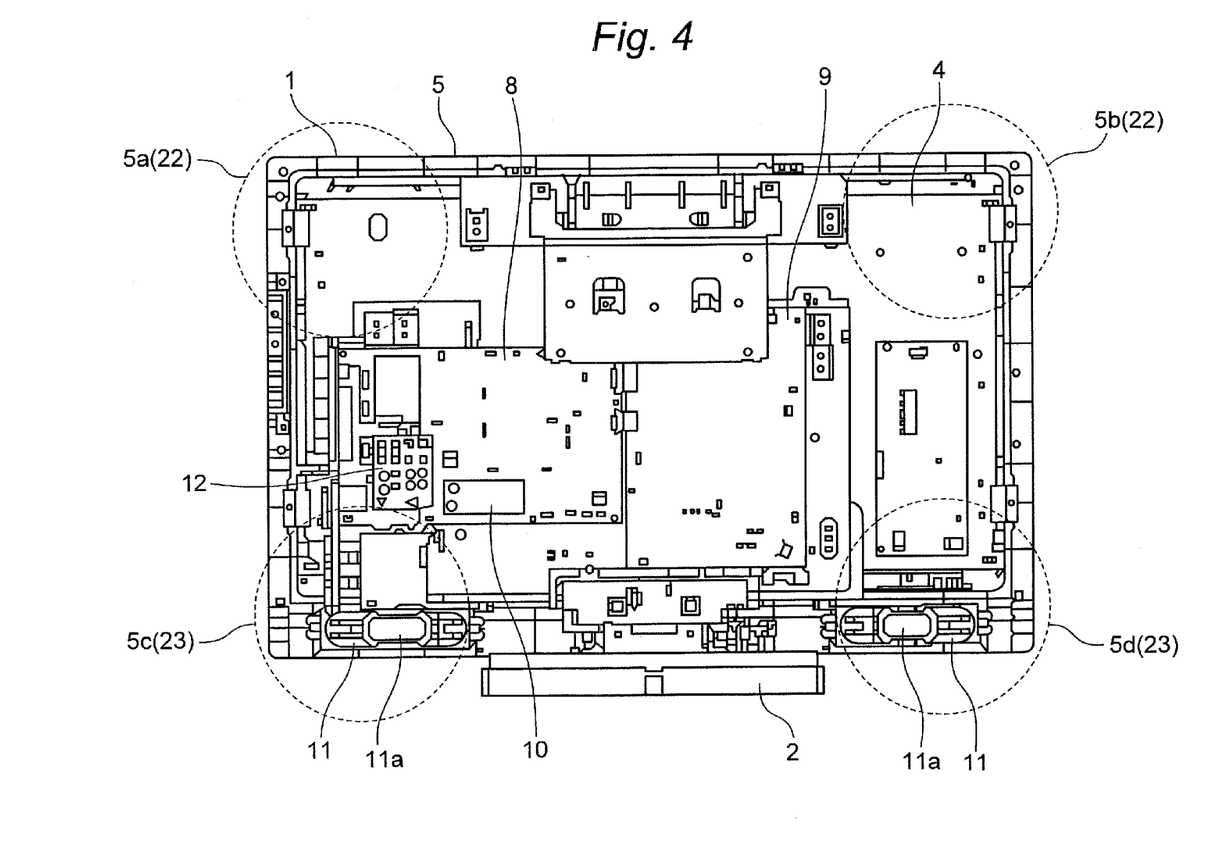
FIG. 4 is a rear view of the liquid crystal display device from which a back cabinet is removed for explaining an example of layout of the circuit block thereof.
Figure 5:
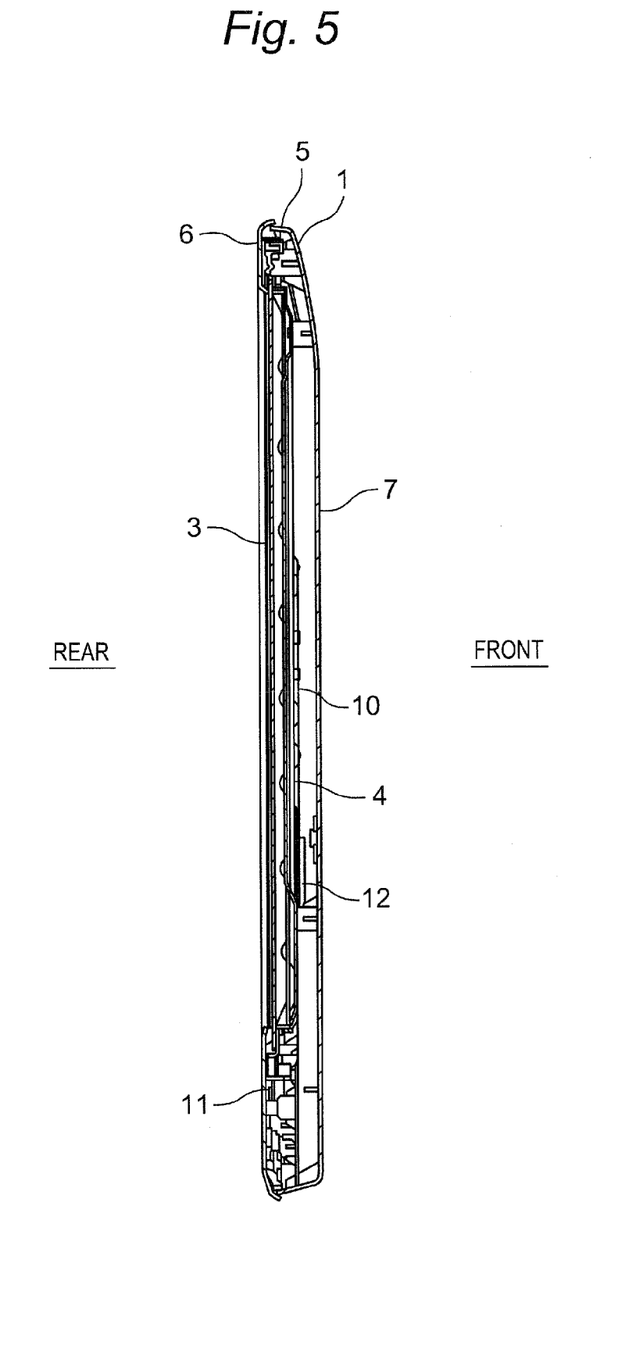
FIG. 5 is a sectional view of the liquid crystal display device taken along a vertical direction.

FIGS. 1 and 2 show an outward appearance of the liquid crystal display device as a completed product according to the embodiment of the present disclosure. FIG. 3 shows a circuit block of an entire structure of the liquid crystal display device. FIG. 4 shows the liquid crystal display device from which a back cabinet is removed for explaining an example of layout of the circuit block thereof. FIG. 5 is a sectional view of the liquid crystal display device taken along a vertical direction.

First, as shown in FIGS. 1 and 2, the liquid crystal display device includes a display device main body 1 and a stand 2 which holds the display device main body 1 in a standing state. The display device main body 1 has a display unit. The display unit includes the liquid crystal display panel 3 as a flat-type display panel, a backlight device 4 (shown in FIG. 5), and a drive circuit block for displaying an image on and the liquid crystal display panel 3. This display unit and a device component (such as speakers 11) constituting the display device main body 1 together with the display unit are accommodated in an outer casing 5 formed as a molded resin product or the like. The outer casing 5 includes a front cabinet 6 having an opening 6a which corresponds to an image display region of the liquid crystal display panel 3 and a back cabinet 7 which is assembled with the front cabinet 6 to cover the rear surface of the display unit. As most clearly shown in FIG. 2, the back cabinet 7 of the outer casing 5 is attached to the front cabinet 6 by means of screws at a plurality of screw fastening portions 7a provided on a peripheral portion of the back cabinet 7.

As shown in FIGS. 3 and 4, the liquid crystal display device generally includes a signal processing circuit block 8, a power supply block 9, a tuner 10, and the speakers 11 which output sound. The signal processing circuit block 8 includes a drive circuit for displaying an image on the liquid crystal display panel 3 and a lighting control circuit which controls lighting of the backlight device 4. The power supply block 9 supplies power-supply voltage to the liquid crystal display panel 3, the backlight device 4, and the signal processing circuit block 8. The tuner 10 receives television broadcast and supplies a reception signal to the signal processing circuit block 8. The signal processing circuit block 8 and the power supply block 9 are respectively formed by mounting circuit components onto a circuit board. The circuit board to which the signal processing circuit block 8, the power supply block 9, and the tuner 10 are mounted is attached the outer casing 5 such that the circuit board is disposed in a space between the rear surface of the backlight device 4 and the back cabinet 7.

In FIG. 3, the speakers 11 are not illustrated. FIG. 4 shows an external signal input terminal 12 for inputting a video signal from an external device such as a DVD player to the liquid crystal display device. The external signal input terminal 12 is mounted onto the signal processing circuit block 8.

Figure 6:
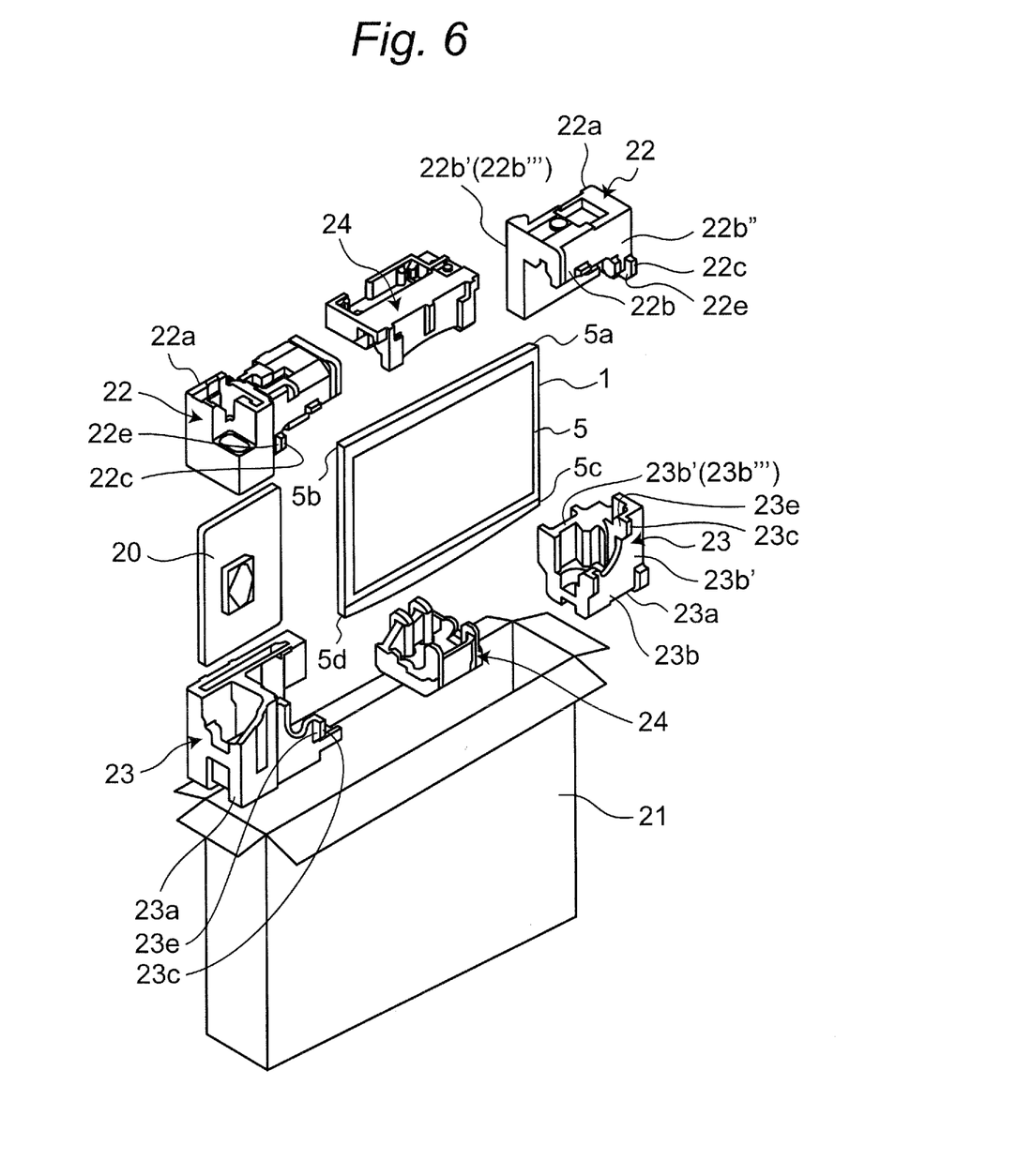
FIG. 6 is a perspective view showing a state where a display device main body is accommodated in a packing box.
Figure 7:
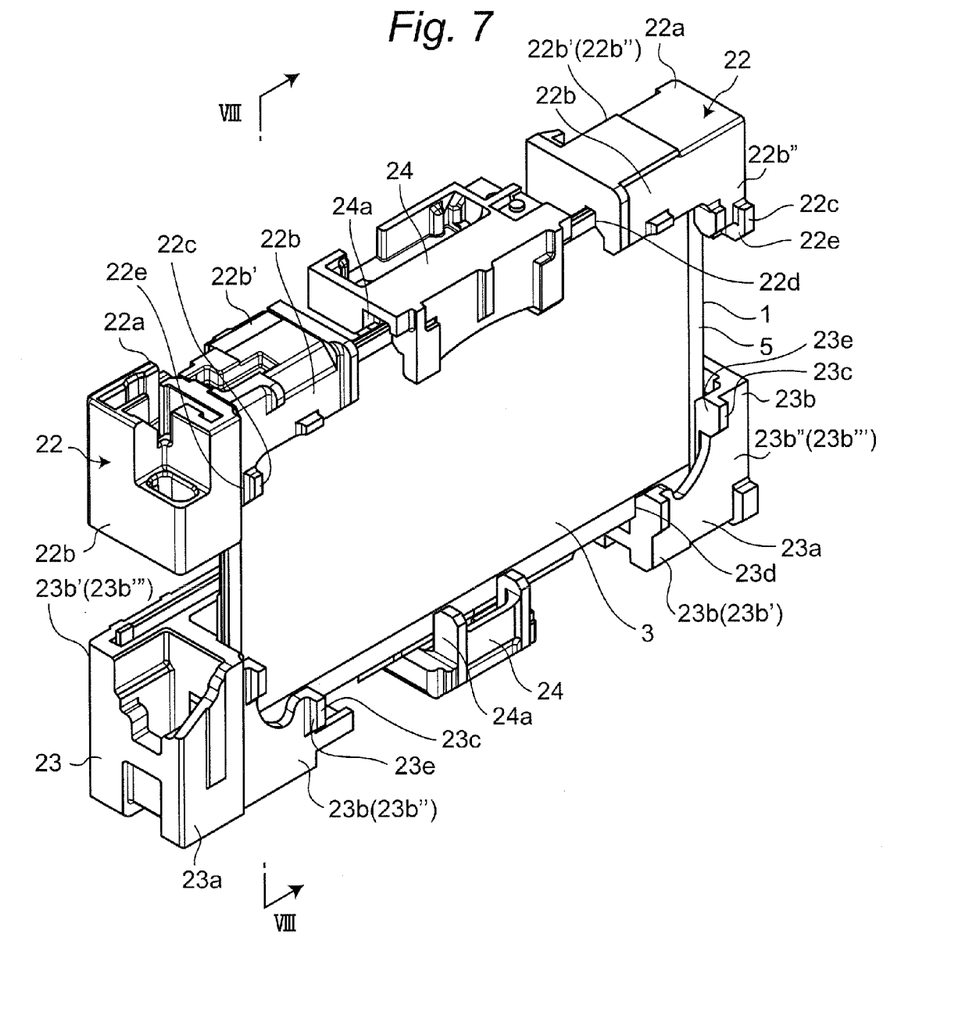
FIG. 7 is a perspective view showing a positional relation between the display device main body and shock-absorbing members.
Figure 8:
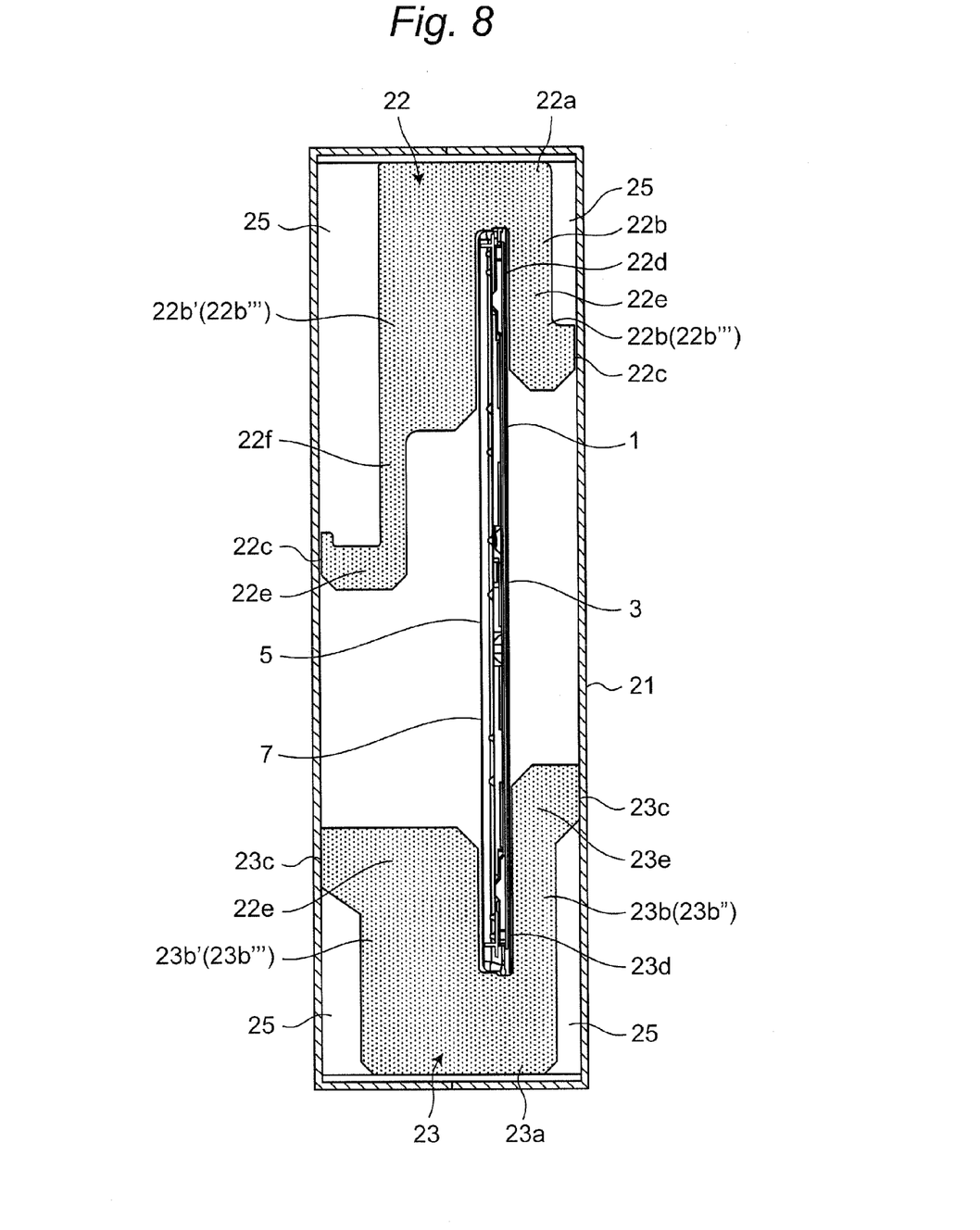
FIG. 8 is a sectional view in a packed state, taken along the vertical direction (taken along line VI-VI in FIG. 6)

FIGS. 6 to 8 are views for explaining a method of packing the liquid crystal display device. FIG. 6 is an exploded perspective view showing a state where the display device main body 1 is accommodated in a packing box 21, FIG. 7 is a perspective view showing a positional relation between the display device main body 1 and shock-absorbing members 22 and 23, and FIG. 8 is a sectional view showing a packed state taken along the vertical direction.

As shown in FIGS. 6 to 8, the display device main body 1 is covered with a packing bag (not shown). Then, the display device main body 1 is packed by being accommodated in the packing box 21 made of cardboard or the like together with an accompanying item 20 such as a remote control unit. In the present embodiment, the packing box 21 has a substantially flat rectangular parallelepiped shape. The shock-absorbing members 22 are respectively disposed at two corners at upper portions in the packing box 21. The two shock-absorbing members 22 are provided as separate bodies and are separately disposed with a space therebetween in the lateral direction. Similarly, the shock-absorbing members 23 are disposed at two corners at lower portions in the packing box 21 and are separately disposed with a distance therebetween in the lateral direction. The shock-absorbing members 22 at the upper corners and the shock-absorbing members 23 at the lower corners are also disposed separately from each other so as to be opposed to each other in the vertical direction. Furthermore, shock-absorbing members 24 are disposed at an upper central portion and a lower central portion in the packing box 21 so as to be separated from the shock-absorbing members 22 and 23. In the present embodiment, these shock-absorbing members 22, 23, and 24 are obtained by forming foamed polystyrene into predetermined shapes. The material for the shock-absorbing members 22, 23, and 24 is not particularly limited as long as the liquid crystal display device in the packing box 21 can be appropriately protected.

As shown in FIGS. 2, 4 and 6, four corner regions, i.e., upper corner regions 5a and 5b and lower corner regions 5c and 5d of the outer casing 5 of the display device main body 1 are held by the shock-absorbing members 22 and 23 which are disposed at the upper and lower corners in the packing box 21.

As shown in FIGS. 7 and 8, the upper corner shock-absorbing members 22 and the lower corner shock-absorbing members 23 respectively include corner regions 22a and 23a. Each of these corner regions covers corresponding corner of the outer casing 5. The shock-absorbing members 22 and 23 respectively include two pairs of extension regions 22b to 22b''' and 23b to 23b'''. These extension regions 22b to 22b''' and 23b to 23b''' extend from the corner regions 22a and 23a toward the opposed corners. First, each of the upper corner shock-absorbing members 22 includes a pair of laterally extending extension regions 22b and 22b' and a pair of downwardly extending extension regions 22b'' and 22b'''. The extension region 22b and the extension region 22b' are opposed to each other with a distance in the front-rear direction. The extension region 22b'' and the extension region 22b''' are also opposed to each other with a distance in the front-back direction. Similarly, each of the lower corner shock-absorbing members 23 includes a pair of laterally extending extension regions 23b and 23b' and a pair of upwardly extending extension regions 23b'' and 23b'''. The extension region 23b and the extension region 23b' are opposed to each other with a distance in the front-rear direction. The extension region 23b'' and the extension region 23b''' are also opposed to each other with a distance in the front-rear direction.

The shock-absorbing members 22 and 23 are provided with grooves 22d and 23d into which the corner regions 5a to 5d of the outer casing 5 of the display device main body 1 are fitted. The grooves 22d and 23d are configured by notches formed in the corner regions 22a and 23a and gaps between the extension regions 22b to 22b''' and 23b to 23b''' which are opposed to each other in the front-back direction. The shock-absorbing members 24 disposed at the upper central portion and the lower central portion are also provided with grooves 24a to which an upper central portion and a lower central portion of the outer casing 5 of the display device main body 1 are fitted.

An upper surface and a lateral surface of the corner region 22a of the upper corner shock-absorbing member 22 abut against an inner wall surface of the packing box 21. A lower surface and a lateral surface of the corner region 23a of the lower corner shock-absorbing member 23 also abut against the inner wall surface of the packing box 21.

The extension regions 22b to 23b''' respectively include projections 22e and 23e which project in a direction (front-rear direction) so as to orthogonally project with respect to the display panel. The extension regions 22b to 23b''' abut against the inner wall surface of the packing box 21 only at tip ends 22c and 23c of the projections 22e and 22f.

Referring to FIG. 8, spaces 25 are provided between the upper and lower corner shock-absorbing members 22 and 23 and the inner wall surface of the packing box 21. First, in front of the upper corner shock-absorbing member 22, the space 25 is provided between the corner region 22a as well as the front surfaces of the extension regions 22b and 22b' (excluding the tip end 22c of the projection 22e) and the inner wall surface of the packing box 21. Further, behind the upper corner shock-absorbing member 22, the space 25 is provided between the corner region 22a as well as the rear surfaces of the extension regions 22b" and 22b''' (excluding the tip end 22c of the projection 22e) and the inner wall surface of the packing box 21. In front of the lower corner shock-absorbing member 23, the space 25 is provided between the corner region 23a as well as the front surfaces of the extension regions 23b and 23' (excluding the tip end 23c of the projection 23e) and the inner wall surface of the packing box 21. Furthermore, behind the lower corner shock-absorbing member 23, the space 25 is provided between the corner region 23a as well as the rear surfaces of the extension regions 23" and 23''' (excluding the tip end 23c of the projection 23e) and the inner wall surface of the packing box 21.

In the upper corner shock-absorbing member 22, a thin portion 22f is formed between each of the extension regions 22b" and 22b''' on a side of the back cabinet 7 (on the rear side) and the tip ends 22c which abuts against the packing box 21.

As shown in FIG. 4, the speaker 11 as an example the device components is disposed in the periphery of the outer casing 5, and heavy magnet 11a of the speakers 11 is positioned in a region of the outer casing 5 where the lower corner shock-absorbing members 23 holds the outer casing. In other words, a center of gravity of the speakers 11 as an example of the device component is positioned within the regions of the outer casing 5 where the lower corner shock-absorbing members 23 holds the outer casing 5.

Example of the device component include a woofer, a relay board, and metal components for attaching the board, and the center of gravity thereof may be positioned in the same manner as that of the speaker 11 according to the present embodiment.

Figure 9:
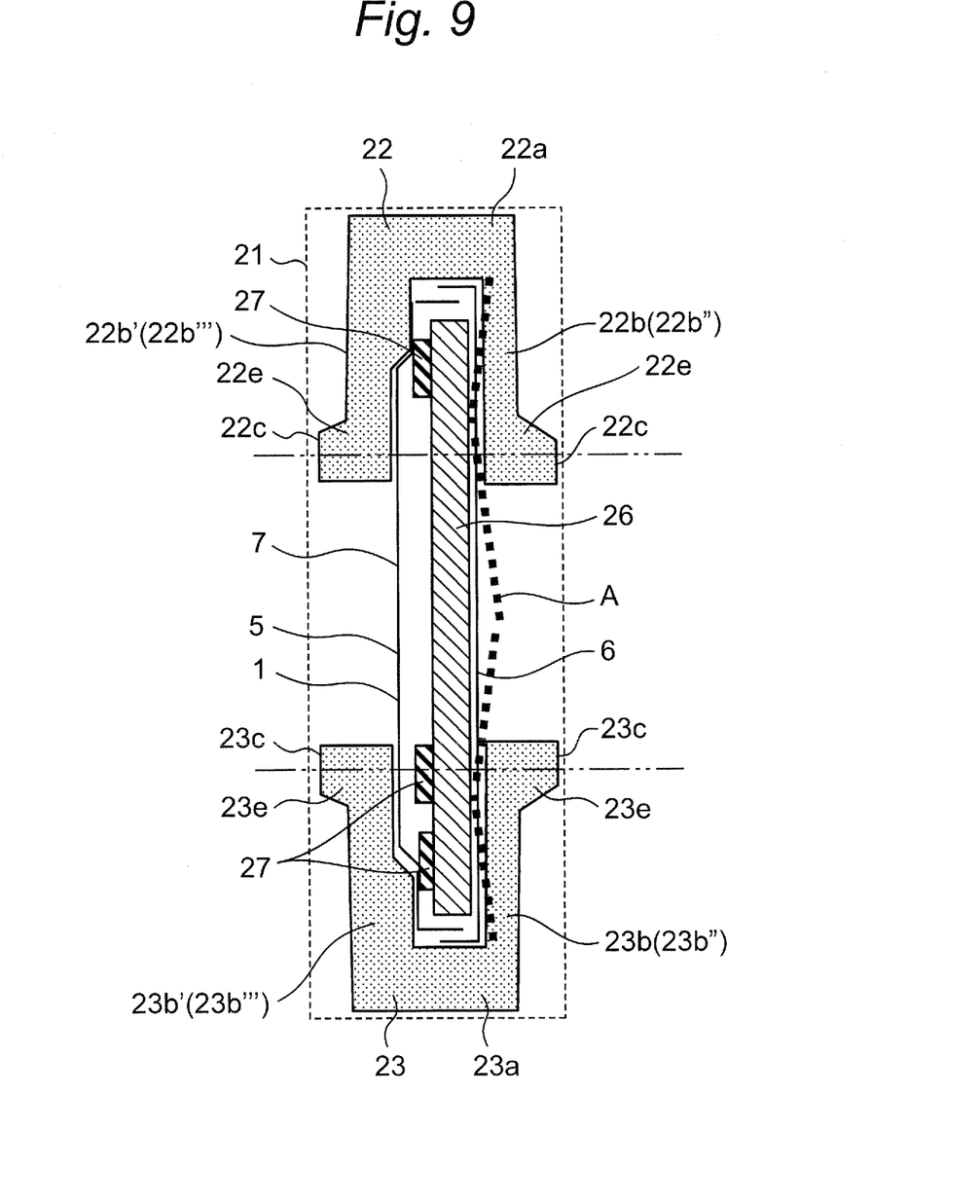
FIG. 9 is a schematic sectional view for explaining an effect of preventing damage.

As shown in FIG. 9, the device component 27 (such as the speakers 11) constituting the display device together with the display unit 26 having the flat-type display panel and the drive circuit block are accommodated in the periphery of the outer casing 5. Further, the device component 27 is accommodated such that the center of gravity thereof is positioned within the region of the outer casing 5 where the upper corner shock-absorbing members 22 and the lower corner shock-absorbing members 23 hold the outer casing 5. This arrangement moderates deformation applied to the display device main body 1 by an external force such as a mechanical impact suffered during transportation. The reason therefor will be described in detail below.

First, each of the tip ends 22c and 23c of the projections 22e and 23e which abuts against the inner wall surface of the packing box 21 serve as a kind of fulcrum against an external force applied to the shock-absorbing members 22 and 23. Since a heavy article is positioned in a region outside the fulcrums (the tip ends 22c and 23c), a mechanical impact is applied to the display device main body 1 suffered during transportation of the display device main body 1, and when a force which tends to deform the display device main body 1 is applied, such force is dispersed without concentrating on the central portion of the display device main body 1. Conceptually, in accordance with the dispersion of the force which tends to deform the display device main body 1, the deformation is eased as shown by dotted line A in FIG. 9. As a result, even when the display device main body 1 is thin and the entire mechanical strength is lowered, the display device main body 1 can be prevented from being damaged by the external force such as the mechanical impact suffered during transportation.

In FIG. 9, the center of gravity of the device component 27 is positioned in both the region of the outer casing 5 where the upper corner shock-absorbing members 22 holds the outer casing 5 and the region of the outer casing 5 where the lower corner shock-absorbing members 23 holds the outer casing 5. However, even if the center gravity of the speaker 11 as the device component is disposed only in the region of the outer casing 5 where the lower corner shock-absorbing members 23 holds the outer casing 5 as shown in FIG. 4, the effect of dispersing deformation against an external force such as the mechanical impact suffered during transportation can be obtained in the same manner as that shown in FIG. 9. In other words, if the center of gravity of the device component 27 is positioned within at least any one of the regions of the outer casing 5 where the upper corner shock-absorbing members 22 or the lower corner shock-absorbing members 23 hold the outer casing 5, the effect of preventing the display device main body 1 from being damaged by an external force can be obtained.

With reference to FIG. 2, the back cabinet 7 which covers the rear surface of the display unit is attached to the front cabinet 6 by screwing the peripheral portion at the plurality of screw fastening portions 7a, as described above. As the frame of the outer casing 5 is narrowed, the width of the peripheral portion of the outer casing 5 is decreased and strength thereof is lowered. Furthermore, it is necessary to form screw holes for the screw fastening portions 7a, with a result that the strength is further lowered.

However, as most clearly shown in FIG. 2, in the present embodiment, out of the plurality of screw fastening portions 7a, those in the upper and lower corner regions 5a, 5b, 5c, and 5d of the outer casing 5 are provided within the regions held by the shock-absorbing members 22 and 23. Therefore, when the external force such as the mechanical impact is applied during transportation, the force transmitted to the screw fastening portions 7a in the corner regions 5a, 5b, 5c, and 5d is reduced or moderated. As a result, even if the strength at the peripheral portion of the outer casing 5 of the display device main body 1 is lowered due to the narrowed frame of the outer casing 5, a force which concentrates on the portion of the lowered strength in the display device main body 1 and which tends to deform this portion is less likely to be applied. As a result, it is possible to prevent the display device main body 1 from being damaged during transportation. In the present embodiment, all of the screw fastening portions 7a on the short sides of the back cabinet 7 (a pair of longer peripheral portions as viewed from a front position correspond to the long sides, and a pair of shorter peripheral portions as viewed from the front position correspond to the short sides) are positioned closer to the corner regions 5a to 5d rather than the tip ends 22c and 23c of the projections 22e and 23e. According to this configuration, it is possible to more reliably prevent the display device main body 1 from being damaged during transportation.

With reference to FIG. 8, the spaces 25 are provided respectively between the upper and lower shock-absorbing members 22 and 23 and the packing box 21. Due to provision of the spaces 25, it is possible to reduce a force transmitted to the shock-absorbing members 22 and 23 when an external force such as a mechanical impact is applied during transportation. Therefore, it is possible to reduce or moderate a force applied to the upper and lower corner regions 5a, 5b, 5c, and 5d of the outer casing 5. When an external force such as the mechanical impact is applied during transportation, the thin portions 22f of the extension regions 22b' and 22b" of the back cabinet 7 (on the rear side) of the upper corner shock-absorbing members 22 are more easily deformed than other portions of the shock-absorbing members 22 (especially the corner regions 22a). Therefore, the thin portions 22f have a function of absorbing the force applied externally. Therefore, also by providing the thin portions 22f, it is possible to reduce or moderate a force applied to the outer casing 5. The thin portion may be provided to each of the extension regions 22b to 23''' of the upper and lower corner shock-absorbing members 22, or may be provided to one or some of the extension regions.

According to the present disclosure, the thin display device is designed to be thinner and to have a narrower frame. Even if a mechanical strength is lowered due to such a design, it is possible to effectively prevent the thin display device from being damaged by the external force such as the mechanical impact suffered during transportation.

As described above, the present disclosure is effective in preventing a thin display device from being damaged by an external force such as a mechanical impact during transportation.

The present disclosure can be applied to not only to a liquid crystal display device but also another thin display device such as a plasma display device.

Although the present disclosure has been fully described in connection with the preferred embodiments thereof with reference to the accompanying drawings, it is to be noted that various changes and modifications are apparent to those skilled in the art. Such changes and modifications are to be understood as included within the scope defined by the appended claims unless they depart therefrom.

What is claimed is:

1. A flat display device, comprising:
    a display unit including a flat-type display panel and a drive circuit block for displaying an image on the display panel; and
    an outer casing accommodating the display unit, upper corner regions and lower corner regions of the outer casing being held by upper corner shock-absorbing members and lower corner shock-absorbing members disposed separately at upper corners and lower corners of a packing box when the flat display device is accommodated in the packing box,
    wherein the outer casing includes a front cabinet disposed on a side of a display surface of the display unit and a back cabinet covering a rear surface of the display unit,
    wherein the back cabinet is attached to the front cabinet by screw fastening portions provided at a peripheral portion of the back cabinet,
    wherein, in the upper and lower corner regions of the outer casing, the screw fastening portions of the back cabinet are positioned within regions held by the shock-absorbing members,
    wherein each of the upper corner shock-absorbing members and the lower corner shock-absorbing members includes a corner region covering a corresponding one of the corner regions of the outer casing, and an extension region extending from the corner region toward an opposing one of the corner regions,
    wherein the extension region includes a projection orthogonally projecting with respect to the display panel and abutting against an inner wall surface of the packing box only at a tip end, the tip end being located at an end of the extension region and away from the corner region, and the inner wall surface extending so as to be parallel with respect to the display panel, and
    wherein the screw fastening portions of the back cabinet are positioned closer to the corner regions than the tip ends of the projections.

2. The flat display device according to claim 1, wherein the back cabinet includes short sides and long sides, and
    wherein all of the screw fastening portions provided on the short sides of the back cabinet are positioned closer to the corner regions than the tip ends of the projections.

3. The flat display device according to claim 2, wherein a space is provided between the packing box and at least one of the upper corner shock-absorbing members and the lower corner shock-absorbing members.

4. The flat display device according to claim 3, wherein the extension region of at least one of the upper corner shock-absorbing members and the lower corner shock-absorbing members has a thin portion.

5. The flat display device according to claim 1, wherein a cross section of the projection is rectangular.

6. The flat display device according to claim 1, wherein an entirety of the projection is orthogonal with respect to the display panel.

7. The flat display device according to claim 1, wherein an entirety of the projection is planar.

8. The flat display device according to claim 1, wherein the projection has a constant width in a direction parallel with respect to the display panel.

9. The flat display device according to claim 1, wherein a width of the tip end in a direction parallel with respect to the display panel and a width of a proximal end of the projection in the direction parallel with respect to the display panel are equal.

* * * * *